United States Patent [19]
Davis

[11] Patent Number: 5,341,833
[45] Date of Patent: Aug. 30, 1994

[54] TIRE VALVE CAP

[76] Inventor: Don Davis, 19622 Lanark, Reseda, Calif. 91335

[21] Appl. No.: 921,712

[22] Filed: Jul. 30, 1992

[51] Int. Cl.⁵ .................................. F16L 55/115
[52] U.S. Cl. ................... 137/232; 138/89.2; 152/428
[58] Field of Search ............. 137/232, 800; 152/427, 152/428; 138/89.1, 89.2, 89.3, 89.4

[56] References Cited

U.S. PATENT DOCUMENTS

| | | | |
|---|---|---|---|
| 729,129 | 5/1903 | Catterall | 137/232 |
| 1,624,914 | 4/1927 | Beechtel | 137/232 |
| 3,280,879 | 10/1966 | Simms | 152/427 |
| 4,004,614 | 1/1977 | Mackal et al. | 137/232 X |
| 4,766,628 | 8/1988 | Walker | 137/232 X |
| 4,768,574 | 9/1988 | Probst | 137/232 X |

FOREIGN PATENT DOCUMENTS

| | | | |
|---|---|---|---|
| 153854 | 3/1952 | Australia | 137/232 |
| 646238 | 8/1962 | Canada | 152/428 |

Primary Examiner—John Rivell

[57] ABSTRACT

A tire valve cap for a flush mounted tire valve seals the tire valve against external debris and internal leakage. Slits in the wall of the cap allow the cap to act like a spring after insertion and to permit any internal leakage to intensify the sealing properties of the cap to the valve.

1 Claim, 1 Drawing Sheet

TIRE VALVE CAP

BACKGROUND OF THE INVENTION

The present invention relates to a cap for sealing off flush-mounted valve bodies in tubless automobile tires. Flush mounted tire valves have been available for some time and are described in the prior art of Simms (U.S. Pat. No. 3,280,879) and Sherwood (U.S. Pat. No. 4,718,639). The purpose of this kind of valve body in auto racing has been to replace the outwardly projecting valve stem which requires extra dynamic balancing to eliminate vibration and may come into destructive contact with the wheel of another car during a race. This can result in a rapid tire deflation if the stem is torn off and a deadly accident. Flush valve bodies have, in addition, become popular in sports car wheels where hub caps are not used and the projecting stem would detract from the decorative effects of the wheel.

One disadvantage of the flush mounted valve body is that the valve opening is left unprotected. Mud and debris can easily accumulate in the small opening and can impede air passage when the tire is being filled. In addition, outward leakage from the valve stem can occur.

It is the prime objective of the present invention to provide an easily applied and removed cap which will protect and seal the air passage of a flush-mounted valve.

It is a second objective of the present invention to provide a decorative cap which will not detract from the "low profile" appearance of the flush-mounted valve body to which it is applied.

DETAILED DESCRIPTION OF THE INVENTION

Figure 1:
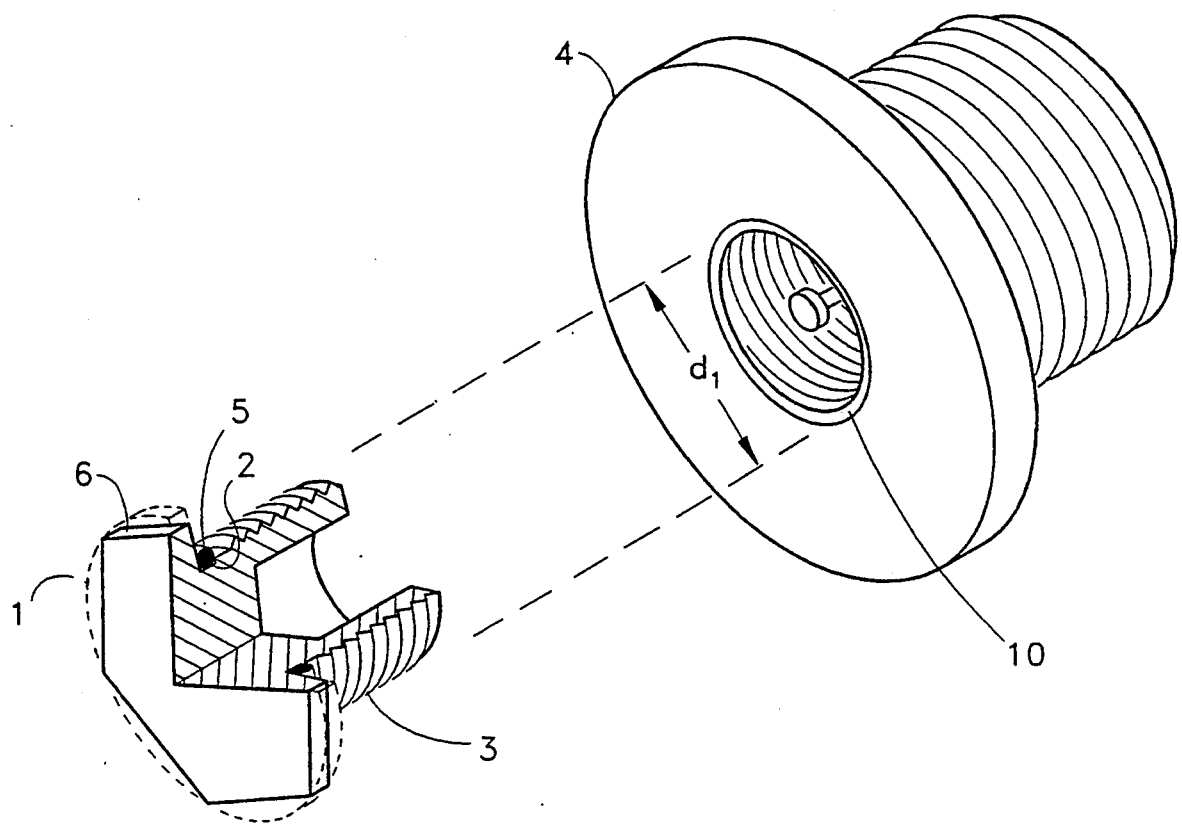
FIG. 1 is a partially-cross sectioned perspective of the cap and the flush-mounted valve to which it is applied.

With reference to FIG. 1 the present invention is the cap 1 made up of the hollowed out, externally threaded insert portion 3 which is closed off by the hexagonally shaped end 6. A groove 2 cut into the threaded portion 3 accommodates the "O" ring 5 which bears against the surface of the valve 4 when the cap is threaded into the valve opening 10 and tightened. It is well known to the art that "O" rings are self sealing when subject to pressure so that the provision of "O" ring 5 will hermetically seal the opening 10 independently of the valve stem mechanism. The cap thus serves two functions: prevents the entrance of extraneous matter into the valve opening 10 and acts as an additional seal should the valve itself fail. The edge of opening 10 is chamfered to aid in the sealing action of the "O" ring.

Figure 2:
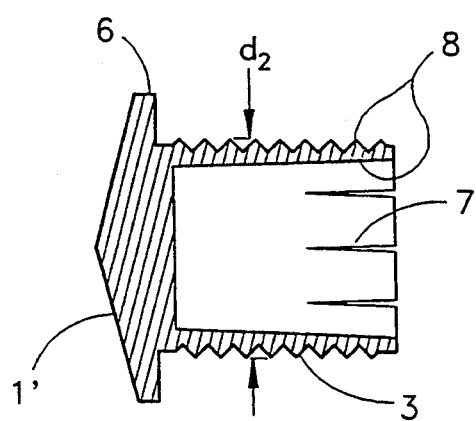
FIG. 2 is a cross section of a second embodiment of the cap showing an alternative method for sealing.

A second embodiment for carrying out the objectives of the invention is illustrated in cross section in FIG. 2. The cap 1' is formed of the hollowed out, externally threaded insert portion 3 closed off by the hexagonally shaped end 6. The wall thickness 8 of the insert portion is relatively small and tapers toward the open end so that some radial flexibility is obtained. Provision of the axial slots 7 permits the inserted portion to decrease in diameter from $d_2$ to the valve diameter $d_1$ (FIG. 1) when the cap is inserted and tightened. This decrease in diameter is similar in action to that of a collet chuck when tightened. It serves to move the sides of the slots 7 together and thus creates a spring pressure against the sides of opening 10. If the valve stem should leak, the internal pressure inside the cap will force the male threads against the female threads thus creating a self sealing action.

What is claimed is as follows:

1. A valve cap for use in a flush mounted valve which has been mounted in a wheel rim adapted for mounting a tubeless tire comprising:
   a) a partially hollowed, externally threaded body adapted for insertion into an internally threaded opening in said flush mounted valve including thin tapering walls provided with a number of slits to produce a collet-like spring action when the cap is inserted;
   b) sealing means in said body;
   c) a solid head at one end of said threaded body shaped to facilitate tightening of said cap after insertion in the flush mounted valve whereby said cap serves to close off said opening in the valve against any externally encountered debris and also seals the valve against internally occurring leakage said leakage serving to increase said spring action and intensify the sealing properties of the thread to thread contact between the cap and the inside of the valve.

* * * * *